(12) United States Patent
Okazaki et al.

(10) Patent No.: US 12,170,387 B2
(45) Date of Patent: Dec. 17, 2024

(54) LITHIUM PRIMARY BATTERY

(71) Applicant: Panasonic Intellectual Property Management Co., Ltd., Osaka (JP)

(72) Inventors: Kyosuke Okazaki, Osaka (JP); Tadayoshi Takahashi, Osaka (JP); Futoshi Tanigawa, Osaka (JP); Naoaki Nishimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 469 days.

(21) Appl. No.: 17/614,398

(22) PCT Filed: Apr. 16, 2020

(86) PCT No.: PCT/JP2020/016669
§ 371 (c)(1),
(2) Date: Nov. 26, 2021

(87) PCT Pub. No.: WO2020/246147
PCT Pub. Date: Dec. 10, 2020

(65) Prior Publication Data
US 2022/0231307 A1  Jul. 21, 2022

(30) Foreign Application Priority Data
Jun. 4, 2019 (JP) .................................. 2019-104640

(51) Int. Cl.
*H01M 6/02* (2006.01)
*H01M 4/08* (2006.01)
(Continued)

(52) U.S. Cl.
CPC ............... *H01M 6/02* (2013.01); *H01M 4/08* (2013.01); *H01M 6/164* (2013.01); *H01M 6/166* (2013.01);
(Continued)

(58) Field of Classification Search
CPC .......... H01M 6/02; H01M 4/08; H01M 6/164; H01M 6/166; H01M 4/364; H01M 4/405;
(Continued)

(56) References Cited

U.S. PATENT DOCUMENTS

| | | | | |
|---|---|---|---|---|
| 6,617,069 B1* | 9/2003 | Hopper | ................. | H02J 7/0031 429/61 |
| 2001/0021471 A1* | 9/2001 | Xing | ....................... | H01M 4/13 429/162 |

(Continued)

FOREIGN PATENT DOCUMENTS

| | | |
|---|---|---|
| JP | 61-074257 | 4/1986 |
| JP | 63-058759 | 3/1988 |

(Continued)

OTHER PUBLICATIONS

International Search Report of PCT application No. PCT/JP2020/016669 dated Jul. 7, 2020.

*Primary Examiner* — Stewart A Fraser
(74) *Attorney, Agent, or Firm* — WHDA, LLP

(57) ABSTRACT

A lithium primary battery including a current collecting wire that electrically connects an electrode body and a sealing body or a battery can, in which the electrode body includes a positive electrode, a negative electrode, and a separator, the negative electrode includes at least one selected from the group consisting of metal lithium and a lithium alloy, the current collecting wire includes a first lead connected to one of the positive electrode and the negative electrode, a second lead connected to the sealing body or the battery can, and an overdischarge suppressing element interposed between the first lead and the second lead, the overdischarge suppressing element includes a first metal layer connected to the first lead, with the first metal layer being thinner than the first lead, a second metal layer connected to the second lead, with the second metal layer being thinner than the second lead, (Continued)

and a conductive layer interposed between the first metal layer and the second metal layer disposed to face each other, the conductive layer includes a resin and a conductive material dispersed in the resin, and the conductive material inserts lithium ions at a potential that is lower than that of the positive electrode.

9 Claims, 2 Drawing Sheets

(51) Int. Cl.
*H01M 6/16* (2006.01)
*H01M 50/533* (2021.01)
H01M 4/36 (2006.01)
H01M 4/40 (2006.01)
H01M 4/66 (2006.01)

(52) U.S. Cl.
CPC ............ *H01M 4/364* (2013.01); *H01M 4/405* (2013.01); *H01M 4/667* (2013.01); *H01M 50/533* (2021.01); *H01M 2300/004* (2013.01)

(58) Field of Classification Search
CPC ............... H01M 4/667; H01M 50/533; H01M 2300/004; H01M 4/06; H01M 6/16
See application file for complete search history.

(56) References Cited

U.S. PATENT DOCUMENTS

| | | | |
|---|---|---|---|
| 2004/0081890 A1* | 4/2004 | Xing | H01M 4/13 429/246 |
| 2005/0175892 A1* | 8/2005 | Mizutani | H01M 10/0587 429/174 |
| 2017/0338470 A1* | 11/2017 | Inoue | H01M 4/62 |
| 2021/0005868 A1* | 1/2021 | Miyoshi | H01M 50/534 |

FOREIGN PATENT DOCUMENTS

| | | |
|---|---|---|
| JP | 63-202072 U | 12/1988 |
| JP | 64-002303 | 1/1989 |
| JP | 1-029973 Y | 9/1989 |
| JP | 2011-048932 | 3/2011 |

* cited by examiner

LITHIUM PRIMARY BATTERY

CROSS-REFERENCE TO RELATED APPLICATIONS

This application is a U.S. national stage application of the PCT International Application No. PCT/JP2020/016669 filed on Apr. 16, 2020, which claims the benefit of foreign priority of Japanese patent application No. 2019-104640 filed on Jun. 4, 2019, the contents all of which are incorporated herein by reference.

TECHNICAL FIELD

The present invention relates to a lithium primary battery.

BACKGROUND ART

Lithium primary batteries are widely used as power sources for general consumers and industrial use because of excellent long-term storage characteristics at high voltages. Depending on the intended use, a plurality of lithium primary batteries may be connected in series or in parallel and then used.

In the case of connecting and then using a plurality of batteries, some of the batteries may be brought into an overdischarge state, thereby generating heat or swelling. For example, in the case of having an individual difference in discharge capacity for each battery, a battery with a low discharge capacity can be discharged to a rated capacity or more. If the discharge proceeds beyond 100% (a limit value at which lithium can be inserted) of the rated capacity of the positive electrode, metal lithium may be deposited in a dendrite shape on the surface of the positive electrode, thereby penetrating the separator and then causing an internal short circuit. The short-circuited part has current constriction, thereby causing the battery to generate heat or swell due to the internal pressure increased by a gas resulting from the decomposition reaction of the electrolyte solution. Then, for industrial use, an attempt has been made to control discharge for each battery with a diode disposed for each battery in advance. In contrast, for consumer devices, because of no individual battery control for the devices, it is difficult to take the same measure, and the battery itself (battery main body) is required to have resistance improved.

PTL 1 teaches a battery characterized in that a conductive polymer piece that has a resistance value rapidly increased by a temperature rise is electrically interposed in series in a current path in a battery case leading to a terminal part for external connection.

PTL 2 teaches a sealed battery characterized in that an electrode current collector 8 is divided at a part protruding from an electrode 3 and thus composed of an electrode-side current collector part 8a and a terminal-side current collector part 8b, and a conductive plastic member 9 that has a temperature-electrical resistance value characteristic that shows an extremely low electrical resistance value at normal temperature and has a resistance value sharply increased when the temperature inside the battery reaches an elevated temperature is interposed between and the electrode-side current collector part 8a and the terminal-side current collector part 8b to cause the conductive plastic member 9 to electrically connect the electrode-side current collector part 8a and the terminal-side current collector part 8b.

PTL 3 teaches a battery characterized in that at least one electrode of a power generating element housed in the battery and an external terminal for the electrode are electrically connected via a PTC element housed in the battery.

CITATION LIST

Patent Literatures

PTL 1: Unexamined Japanese Patent Publication No. 61-74257
PTL 2: Japanese examined Utility Model Publication No. 1-29973
PTL 3: Unexamined Japanese Utility Model Publication No. 63-202072

SUMMARY OF THE INVENTION

The conductive polymer piece, conductive plastic member, or PTC element included in the batteries in PTL 1 to PTL 3, however, is not sufficiently intended for at least the case where the battery is brought into an overdischarge state, and is adapted to operate after the battery temperature reaches a high temperature (for example, 80° C. or higher). Thus, the heat generation of the battery can be insufficiently suppressed, and the battery can also swell. In addition, when the battery temperature is decreased, a current can then flow through the battery, there is thus a possibility that the battery may subsequently remaining in an overdischarge state, and it is difficult to safely discard the battery.

An aspect of the present invention relates to a lithium primary battery including an electrode body, a nonaqueous electrolyte solution, a battery can that houses the electrode body and the nonaqueous electrolyte solution, a sealing body that seals an opening of the battery can, and a current collecting wire that electrically connects the electrode body and the sealing body or connects the electrode body and the battery can, in which the electrode body includes a positive electrode, a negative electrode, and a separator interposed between the positive electrode and the negative electrode, the negative electrode includes metal lithium, or includes metal lithium and a lithium alloy, the current collecting wire includes a first lead connected to one of the positive electrode and the negative electrode, a second lead connected to the sealing body or the battery can, and an overdischarge suppressing element interposed between the first lead and the second lead, the overdischarge suppressing element includes a first metal layer connected to the first lead, with the first metal layer being thinner than the first lead, a second metal layer connected to the second lead, with the second metal layer being thinner than the second lead, and a conductive layer interposed between the first metal layer and the second metal layer disposed to face each other, the conductive layer includes a resin and a conductive material dispersed in the resin, and the conductive material inserts lithium ions at a potential that is lower than that of the positive electrode.

The lithium primary battery according to the present invention enhances the safety of the battery in the case of overdischarge.

DESCRIPTION OF EMBODIMENT

Figure 1:
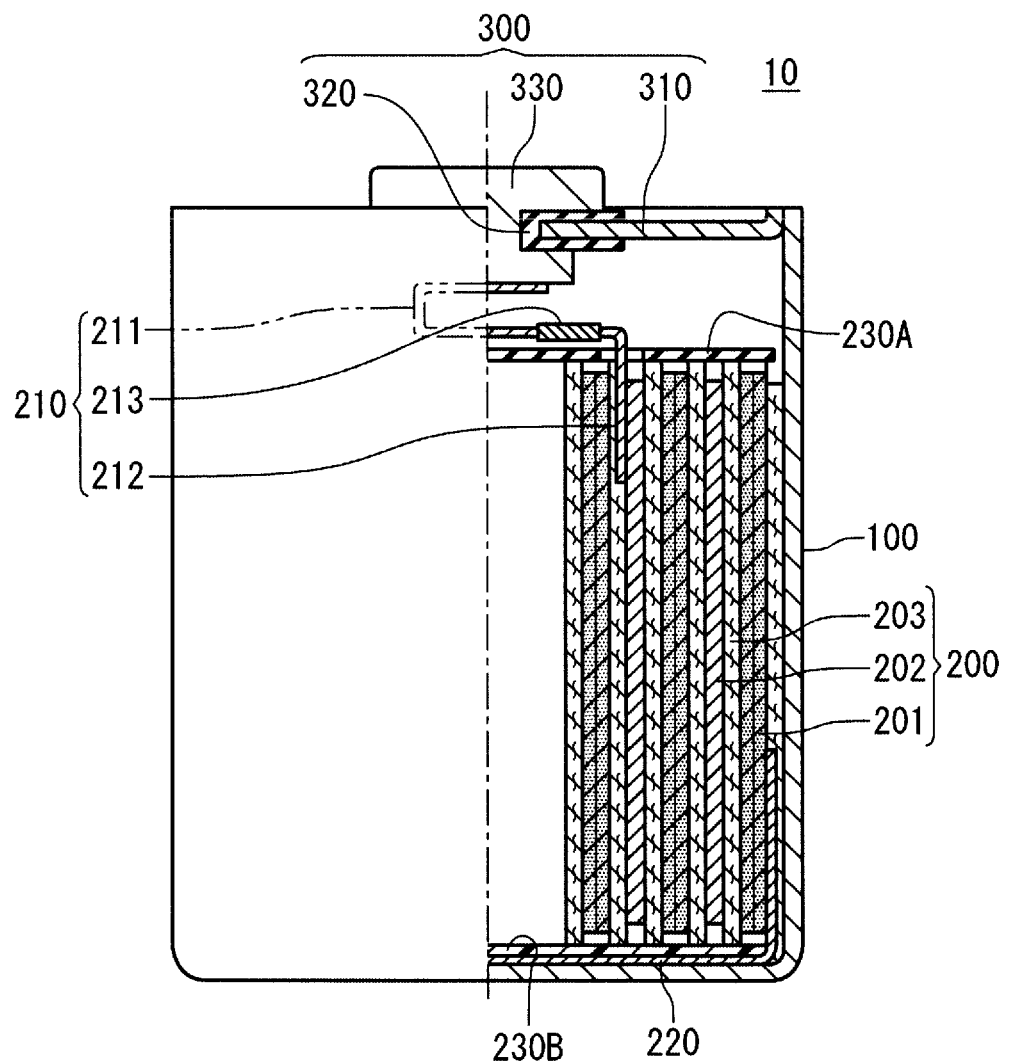
FIG. 1 is a front view illustrating a part of a lithium primary battery according to an exemplary embodiment of the present invention in a schematic longitudinal section.

A lithium primary battery according to the present invention includes an electrode body, a nonaqueous electrolyte solution, a battery can that houses the electrode body and the nonaqueous electrolyte solution, a sealing body that seals an opening of the battery can, and a current collecting wire that electrically connects the electrode body and the sealing body or the electrode body and the battery can.

The electrode body includes a positive electrode, a negative electrode, and a separator interposed between the positive electrode and the negative electrode. The negative electrode contains metal lithium, or contains metal lithium and a lithium alloy. The positive electrode contains, for example, a manganese dioxide as a positive electrode active material.

In this regard, the current collecting wire (first current collecting wire) includes a first lead connected to one of the positive electrode and the negative electrode, a second lead connected to the sealing body or the battery can, and an overdischarge suppressing element interposed between the first lead and the second lead. More specifically, the overdischarge suppressing element is disposed in the middle of the first current collecting wire to connect the first lead and the second lead in series. The first current collecting wire may be connected to either the positive electrode or the negative electrode.

Further, in the case where the first current collecting wire connects one of the positive electrode and the negative electrode to the sealing body, the lithium primary battery may further include another current collecting wire (second current collecting wire) that connects the other of the positive electrode and the negative electrode to the battery can. Similarly, in the case where the first current collecting wire connects one of the positive electrode and the negative electrode to the battery can, the lithium primary battery may further include another current collecting wire (second current collecting wire) that connects the other of the positive electrode and the negative electrode to the sealing body.

The overdischarge suppressing element includes a first metal layer that is connected to the first lead and thinner than the first lead, a second metal layer that is connected to the second lead and thinner than the second lead, and a conductive layer interposed between the first metal layer and the second metal layer disposed to face each other. In this case, one end part of the first lead may be connected to the positive electrode or the negative electrode, and the other end part thereof may be connected to the first metal layer. In addition, one end part of the second lead may be connected to the sealing body or the battery can, and the other end part thereof may be connected to the second metal layer. The conductive layer is disposed so as to fill at least a part of a gap between the first metal layer and the second metal layer. The current flowing through the current collecting wire flows from the electrode to the first lead, the first metal layer, the conductive layer, the second metal layer, the second lead, and the sealing body or the battery can in this order (vice versa).

Each of the first lead and the second lead is flexible, and formed from, for example, a metal foil. Thus, the current collecting wire is flexible as a whole. The second current collecting wire is also formed from, for example, a metal foil.

In the case where the first current collecting wire (or the second current collecting wire) is connected to the positive electrode, the material of the metal foil constituting the first lead and the second lead can be, for example, stainless steel (SUS) (preferably SUS 444 or SUS 316), aluminum (Al), an Al alloy, titanium (Ti), a Ti alloy, or the like.

In the case where the first current collecting wire (or the second current collecting wire) is connected to the negative electrode, the material of the metal foil constituting the first lead and the second lead is, for example, nickel (Ni), an Ni alloy, copper (Cu), a Cu alloy, iron (Fe), an Fe alloy, SUS, or the like. Alternatively, a two-layer clad material such as Ni/Cu, Ni/Fe, Ni/SUS, or Cu/SUS, or a three-layer clad material such as Ni/Fe/Ni, Ni/Cu/Ni, SUS/Cu/SUS, or Ni/SUS/Ni may be used.

The conductive layer includes a resin and a conductive material dispersed in the resin. The conductive material inserts lithium ions at a potential that is lower than that of the positive electrode. More specifically, the conductive material inserts lithium ions when the battery is discharged up to a rated capacity or more into an overdischarge state. As a result, the resistance of the conductive layer increases at an initial stage of the overdischarge to suppress the current. Accordingly, the heat generation and expansion of the battery are effectively suppressed, and the safety of the battery is enhanced.

The principle will be described below. When discharging is continued even after the positive electrode is sufficiently filled with lithium ions, lithium ions that are not inserted by the positive electrode are inserted by the conductive material, thereby expanding the conductive material. When the conductive material is expanded, the conductive layer is expanded or deformed, and the resistance of the conductive layer is rapidly increased. The response speed in this case is very fast, thus allowing the heat generation and swelling of the battery to be effectively suppressed. In addition, the insertion of lithium ions by the conductive material proceeds regardless of the battery temperature, thus allowing heat generation and swelling of the battery to be avoided. More specifically, there is no need for the battery temperature to be increased to expand the resin in the conductive layer for increasing the resistance of the conductive layer. In addition, the increased resistance of the conductive layer is irreversible, thus also avoiding the battery subsequently remaining in an overdischarge state. Accordingly, the battery can be safely discarded.

The current collecting wire is disposed, for example, in the space between the electrode body and the sealing body or the space between the electrode body and the bottom of the battery can. Thus, the overdischarge suppressing element (conductive layer) disposed in the middle of the current path of the current collecting wire (that is, between the first lead and the second lead) is held by the tension of the current collecting wire in the space between the electrode body and the sealing body or the battery can, and the conductive layer is less likely to be subjected to the pressing force in the thickness. In other words, the overdischarge suppressing element is mainly held by the first lead and the second lead. Accordingly, in the case where the conductive material inserts lithium ions, the thickness of the conductive layer is significantly changed, thereby making the increase in the resistance of the conductive layer more likely to be steep.

It is to be noted that the reason that the resistance of the conductive layer is increased by the expansion of the conductive material even without any expansion of the resin is believed to be because voids are formed in the conductive layer due to the expansion of the conductive material, thereby reducing the points of contact between the conductive materials.

The overdischarge suppressing element is disposed in the vicinity of the electrode body so as to allow for ensuring contact with the nonaqueous electrolyte solution. As the conductive layer is disposed closer to the electrode, the lithium ions are inserted more rapidly, thereby making the response speed of current suppression faster. The distance from the connection between the first lead and the electrode to the center of the overdischarge suppressing element (that is, the conductive layer) is preferably less than or equal to 2L/3, and more preferably less than or equal to L/2, where L represents the length of the first current collecting wire. From the viewpoint of further increasing the response speed, the conductive layer is desirably closer to the negative electrode, and thus, the first current collecting wire may be connected to the negative electrode.

The initial resistance value of the overdischarge suppressing element in direct current is desirably as small as possible, and is, for example, preferably less than or equal to 70 mΩ, more preferably less than or equal to 40 mΩ or less, even more preferably less than or equal to 10 mΩ. Accordingly, the thickness of the conductive layer preferably ranges, for example, from 100 μm to 400 μm inclusive, more preferably, for example, from 200 μm to 300 μm inclusive. Within such a thickness range, a conductive layer is easily formed, which has an excellent response speed of current inhibition and a small initial resistance value.

The overdischarge suppressing element includes a laminate of the first metal layer, the conductive layer, and the second metal layer. In the laminate, the first metal layer and the second metal layer are made thinner respectively than the first lead and the second lead, thereby making the thickness change of the conductive layer faster, and making the response speed of current suppression faster. The thicknesses of the first metal layer and second metal layer may be respectively, for example, 0.15 to 0.65 times as large as the thicknesses of the first lead and the second lead.

It is to be noted that the change in the thickness of the conductive layer proceeds from the side surface of the conductive layer in contact with the nonaqueous electrolyte solution. In the case where the first metal layer and the second metal layer are not used, for example, it is difficult to control the exposed side surface of the conductive layer, and it is also difficult to control the penetration rate of lithium ions into the conductive layer, and the response speed of current suppression may be decreased, or the current suppression may fail to function.

In the case where the first lead and the second lead have a flexible band shape, the first current collecting wire also has a flexible band shape as a whole. In this regard, in the case where the first lead and the second lead both have a band shape with a narrow width, the area of connection between the overdischarge suppressing element or conductive layer and each lead is more likely to be decreased. From the viewpoint of reducing the internal resistance during normal discharge as much as possible, however, the area of connection is desirably larger. In the case where the first lead and the second lead are connected respectively to the first metal layer and the second metal layer, the area of connection can be increased by making the dimensions of each metal layer larger than the width of each lead.

The widths of the first lead and second lead are not particularly limited, but ranges, for example, from 3.0 mm to 5.0 mm inclusive in the case of a general-purpose lithium primary battery. The first metal layer and the second metal layer may be, however, for example, a plate member that is from 1.1 times to 2.0 times as large in width as each lead, and may have, for example, a disk shape that has a diameter larger than the width of each lead.

Further, the shape of the conductive layer may be elliptical, polygonal, or the like, but is most preferably circular. In the case of a circular shape, lithium ions can be uniformly inserted from an outer edge of the conductive layer, thus making the conductive layer more likely to be uniformly expanded, and making the response speed of current suppression faster. In the case of a polygon, a difference in the insertion rate of lithium ions can be produced between the corner part and the straight part, thereby producing a site where the thickness of the conductive layer is less likely to be changed.

In the case where the shape of the conductive layer is circular, the shapes of the first metal layer and second metal layer may be circular to correspond to the shape of the conductive layer. In this case, the overdischarge suppressing element has a disk shape as a whole. In this case, diameter D1 of the first metal layer may be equal to diameter D2 of the second metal layer, and a ratio of D1/D2 may be designed to satisfy $0.95 \leq D1/D2 \leq 1.05$. In addition, the circular shape is not necessarily considered to mean a mathematically exact circle, but may be regarded as a substantially circular shape. For example, the circularity may be 0.95 or more, and is preferably 0.99 or more.

In addition, the thicknesses of the first lead and second lead are not particularly limited, but ranges, for example, from 70 μm to 150 μm inclusive in the case of a general-purpose lithium primary battery. Thickness T1 of the first metal layer may be equal to thickness T2 of the second metal layer, and for example, a ratio of T1/T2 may be designed to satisfy $0.95 \leq T1/T2 \leq 1.05$. The thickness of each metal layer may be, for example, an average value in the case of measuring the thickness of the metal layer at arbitrary five sites.

The connection between the first lead and the first metal layer and the connection between the second lead and the second metal layer can be performed by soldering, brazing, resistance welding, normal temperature welding, friction welding, friction stir welding, ultrasonic welding, diffusion connecting, arc welding, electron beam welding, laser welding, or the like. Connecting with a conductive adhesive may be employed.

The mechanical strength is important at the connection part between the first lead and the first metal layer and the connection part between the second lead and the second metal layer. A specific method for measuring the mechanical strength will be provided below. With the overdischarge suppressing element fixed, the breaking strength in the case of applying a tensile shear load to either the first lead or the second lead in parallel with the connection part at a constant speed of 20 cm/min is defined as the mechanical strength. The mechanical strength is preferably 30 N or more. In the case of connection at multiple points, the total strength at the connection points is preferably adjusted to be 30 N or more.

The materials of the first metal layer and second metal layer may be, for example, Ni, Cu, SUS, or the like. In addition, such a material that can be used as a material for the current collecting wire, for example, a two-layer clad material, a three-layer clad material, or the like may be used.

The conductive material may be a material that inserts lithium ions at a potential that is lower than that of the positive electrode, and may contain, for example, at least one selected from the group consisting of a metal, a semimetal, and a carbon material. As the metal, for example, at least one selected from the group consisting of Al, Zn, Cd, In, Sn, Pb, Ti, and Bi can be used. These metals may form alloys. As the semimetal, for example, at least one selected from the group consisting of Ge, Si, Se, and Te can be used. These metals may form compounds. As the carbon material, for example, at least one selected from the group consisting of graphite, non-graphitizable carbon, carbon black, and carbon fibers can be used. Among these materials, a carbon material is preferred from the viewpoints of high stability in a battery and low price. Among the carbon materials, carbon black is preferred from the viewpoint of easily forming a thin conductive layer with high conductivity.

The conductive material may be a particulate material. The average particle size (D50) of the primary particles of the particulate material preferably ranges from 10 nm to 200 nm inclusive. As long as the size is 10 nm or more, the dispersibility of the particulate material in the conductive layer is easily enhanced, and the initial resistance is easily reduced. In addition, the size adjusted to less than or equal to 200 nm makes it easy to control the thickness of the conductive layer for the reduction of the thickness, and makes it easy to reduce the initial resistance.

The average particle size (hereinafter, D50) of the primary particles is a value of a 50% cumulative value (median diameter) in the volume-based particle size (particle size) distribution measured with the use of an induced diffraction grating method after the particulate material is subjected to an ultrasonic dispersion treatment in a dispersion medium. Examples of the measuring device include a single nanoparticle size measuring device IG-1000 Plus (manufactured by Shimadzu Corporation).

As the resin for dispersing the conductive material, rubbers (natural rubbers, synthetic rubbers, and the like), polyolefins (polyethylenes, polypropylenes, and the like), copolymers from at least one olefin and at least one polar comonomer, polyarylenes, polyesters, polyamides, polycarbonates, fluororesins, acrylic polymers, silicone-based polymers, vinyl ester-based polymers, and the like can be used. One of these resins may be used alone, or two or more thereof may be used in mixture.

Examples of the synthetic rubbers include rubber-based polymers such as polyisoprene rubbers, styrene-butadiene (SB) rubbers, styrene-isoprene (SI) rubbers, styrene-isoprene-styrene block copolymer (SIS) rubbers, styrene-butadiene-styrene block copolymer (SBS) rubbers, styrene-ethylene-butylene-styrene block copolymer (SEBS) rubbers, styrene-ethylene-propylene-styrene block copolymer (SEPS) rubbers, styrene-ethylene-propylene block copolymer (SEP) rubbers, regenerated rubbers, butyl rubbers, polyisobutylenes, and modified products thereof.

The content of the conductive material in the conductive layer (that is, the content of the conductive material in the total of the resin and the conductive material) may be appropriately selected such that sufficient conductivity can be secured. The content of the conductive material in the conductive layer preferably ranges, for example, from 5% by mass to 80% by mass inclusive. The content is adjusted to 5% by mass or more, thereby easily reducing the initial resistance of the conductive layer. In addition, the content is adjusted to less than or equal to 80 mass %, thereby facilitating the process of forming the conductive layer. In particular, in the case of using carbon black as the conductive material, the content of the conductive material in the conductive layer preferably ranges, for example, from 10% by mass to 80% by mass inclusive.

FIG. 1 is a front view illustrating a part of a lithium primary battery according to an exemplary embodiment of the present invention in a schematic longitudinal section.

Lithium primary battery 10 includes cylindrical battery can having bottom 100, wound electrode body 200 housed in battery can 100, and sealing plate 310 that blocks an opening of battery can 100. The peripheral edge of sealing plate 310 is fixed by welding to the vicinity of the opening of battery can 100. The center of sealing plate 310 has an opening formed, and the opening has external terminal 330 disposed. Insulating gasket 320 is disposed between external terminal 330 and sealing plate 310. Sealing plate 310, external terminal 330, and gasket 320 constitute sealing body 300.

Each of battery can 100 and sealing plate 310 is made from, for example, iron, an iron alloy (such as SUS), aluminum, an aluminum alloy (such as an aluminum alloy containing minute amounts of other metals such as manganese and copper), or the like, and may be plated, if necessary.

Electrode body 200 is formed by spirally winding sheet-like positive electrode 201 and sheet-like negative electrode 202 with sheet-like separator 203 interposed therebetween. One end of first current collecting wire 210 is connected to one (in the illustrated example, negative electrode 202) of positive electrode 201 and negative electrode 202. The other end of first current collecting wire 210 is connected to external terminal 330 by welding or the like. More specifically, first current collecting wire 210 connects negative electrode 202 and external terminal 330 to electrically connect electrode body 200 and sealing body 300. One end of second current collecting wire 220 is connected to the other (in the illustrated example, positive electrode 201) of positive electrode 201 and negative electrode 202. The other end of second current collecting wire 220 is connected to an inner surface of battery can 100 by welding or the like.

Wound electrode body 200 is housed inside battery can 100 together with a nonaqueous electrolyte solution (not shown). For preventing an internal short circuit, the upper and lower parts of electrode body 200 respectively have upper insulating plate 230A and lower insulating plate 230B disposed.

Figure 2:
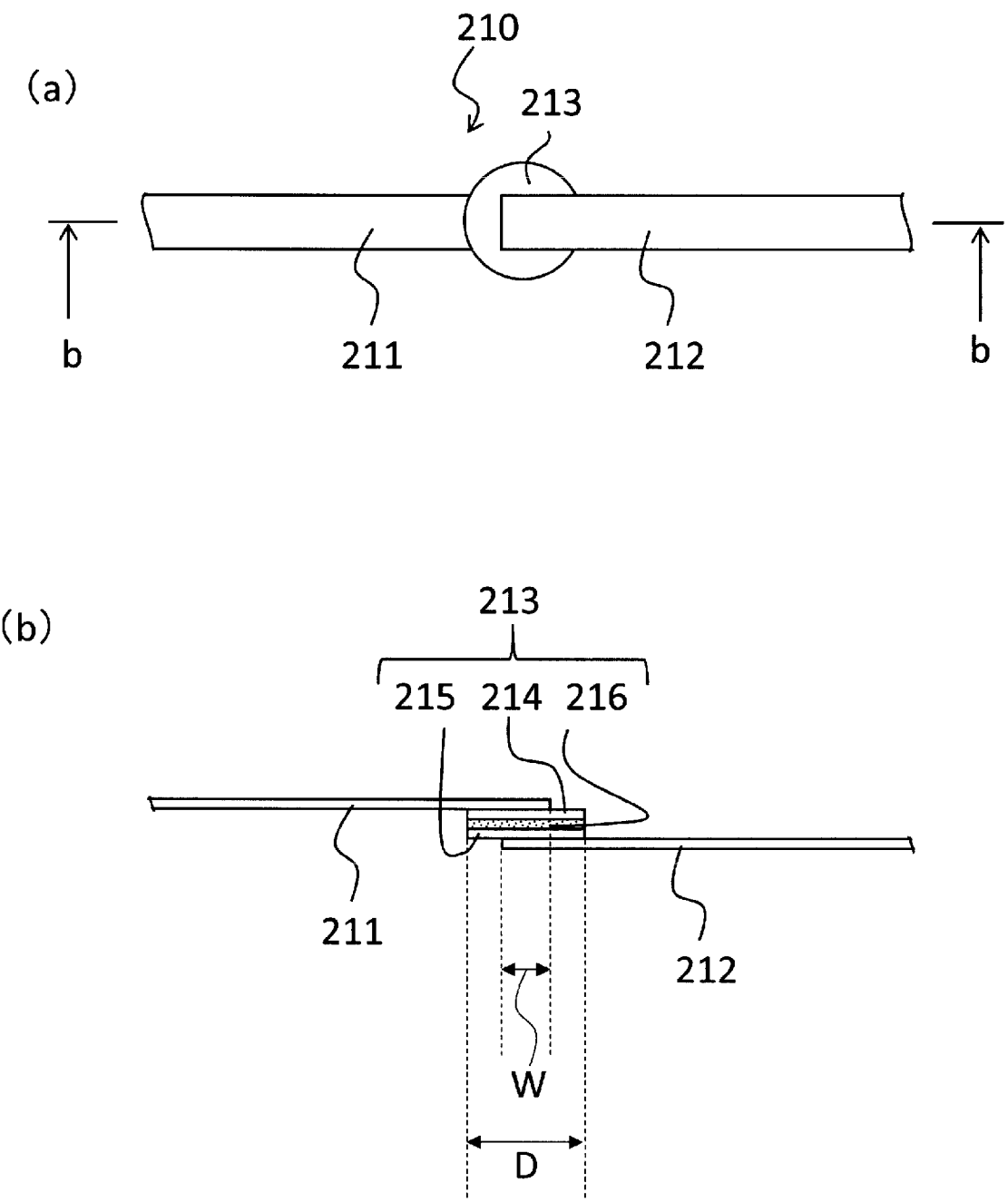
FIG. 2 has a plan view (a) illustrating a configuration of a first current collecting wire that electrically connects an electrode body and a sealing body according to an exemplary embodiment of the present invention, and a cross-sectional view (b) thereof along line b-b.

FIG. 2 has a plan view (a) illustrating the configuration of a first current collecting wire, and a cross-sectional view (b) thereof along line b-b. First current collecting wire 210 includes first lead 211, second lead 212, and overdischarge suppressing element 213 interposed therebetween. Overdischarge suppressing element 213 includes first metal layer 214 connected to first lead 211, second metal layer 215 connected to second lead 212, and conductive layer 216 that entirely fills a gap between first metal layer 214 and second metal layer 215 disposed to face each other. Conductive layer 216 includes a resin and a conductive material dispersed in the resin. The conductive material inserts lithium ions at a potential that is lower than that of positive electrode 201.

In the cross-sectional view (b), an end part of first lead 211 and an end part of second lead 212 are disposed to overlap with each other in a thickness of overdischarge suppressing element 213. Such an overlap is formed, thereby allowing the response speed of current suppression to be further increased. The insertion reaction of lithium ions is believed to be more likely to proceed quickly at a part of the conductive layer disposed between the mutually overlapping end parts of the both leads. Overlapping width W at the both end parts and diameter D of the overdischarge suppressing element may satisfy, for example, $0.2 \leq W/D \leq 0.9$.

In the illustrated example, the cylindrical lithium primary battery has been described, but the present exemplary embodiment can also be applied to lithium primary batteries in other forms without being limited to this case. In addition, the opening of the battery can may be sealed by swaging to the peripheral edge of the sealing body. In this case, an insulating gasket is disposed between the opening of the battery can and the peripheral edge of the sealing body.

Next, a method for manufacturing the overdischarge suppressing element will be illustrated. First, a conductive material capable of inserting lithium ions and a resin are subjected to uniformly kneading to prepare a resin composition. For example, a conductive material is added into a molten resin or a resin solution containing solvent, and the mixture is then uniformly mixed. As the kneading device, mixers including a stirring blade are preferred, such as a Banbury mixer, a roll mill, a kneader, a Disper, a high-speed mixer, a tumbler mixer, a planetary mixer, and a Shinagawa-type mixer.

Next, the resin composition is molded into a sheet material with a predetermined thickness by an extrusion method, a calendering method, or the like. In the case where a liquid dispersion medium is used, the sheet material may be dried to remove the dispersion medium. Next, a pair of metal layers is connected to both surfaces of the sheet material to obtain a laminate composed of the pair of metal layers and the sheet material interposed therebetween. As long as the resin is a thermoplastic resin, the connecting can be performed by, for example, thermal welding. The laminate is subjected to punching into a predetermined shape (for example, a disk shape), thereby allowing an overdischarge suppressing composition to be obtained. The pair of metal layers function respectively as a first metal layer and a second metal layer. The sheet material functions as a conductive layer.

Hereinafter, the configuration elements of the lithium primary battery will be further described.

(Negative Electrode)

The negative electrode contains metal lithium, or contains metal lithium and a lithium alloy. Examples of the lithium alloy include Li—Al, Li—Sn, Li—Ni—Si, and Li—Pb. Among lithium alloys, an Li—Al alloy is preferred from the viewpoints of the potential and the composition of alloying with lithium. The content of the metal element other than lithium, contained in the lithium alloy, preferably ranges from 0.05% by mass to 1.0% by mass inclusive with respect to the metal element alloyed with lithium. Further, the metal lithium may contain less than 0.05% by mass of elements other than lithium.

As the sheet-like negative electrode, for example, a metal lithium foil or a composite sheet containing metal lithium and a lithium alloy is used. In the composite, the lithium alloy may be scattered in the form of particles in the metal lithium. The sheet-like negative electrode can be formed by, for example, extruding metal lithium or extruding metal lithium and a lithium alloy. The lithium alloy may be formed by attaching an Al lattice or the like to the surface of a metal lithium foil and then alloying the surface layer of the metal lithium foil.

(Positive Electrode)

The positive electrode contains a positive electrode active material. As the positive electrode active material, materials for use in positive electrodes of primary batteries and secondary batteries can be arbitrarily selected and then used. For example, manganese dioxide, graphite fluoride, iron sulfide, lithium manganate, and the like can be used. The positive electrode includes, for example, a positive current collector and a positive electrode composite layer containing a positive electrode active material.

As the material of the positive current collector, stainless steel, a metal material containing Al and/or Ti, or the like can be used. As the stainless steel, stainless steel with high corrosion resistance is preferred, such as SUS 444 or SUS 316. The metal material containing Al and/or Ti may be an alloy. As the positive current collector, for example, a sheet or a porous body is used. As the positive current collector, a metal foil or the like may be used. In addition, a metal mesh (or net), an expanded metal, a punching metal, or the like may be used as a porous positive current collector.

The positive composite constituting the positive electrode composite layer may contain, in addition to the positive active material, a binder and/or a conductive agent as an optional component. Examples of the binder include a fluororesin, polyacrylonitrile, a polyimide resin, an acrylic resin, a polyolefin resin, and a rubber-like polymer. Examples of the fluororesin include polytetrafluoroethylene and polyvinylidene fluoride. The positive electrode composite may contain one binder, or contain two or more binders.

As the conductive agent, a carbon material is preferred. Examples of the carbon material include carbon black (such as acetylene black and Ketjen black), carbon nanotubes, and graphite. The positive electrode composite may contain one conductive agent, or two or more conductive agents. The conductive agent may be present between the positive current collector and the positive electrode composite layer.

The method for producing the positive electrode is not particularly limited. The positive electrode can be obtained by, for example, attaching the positive electrode composite to the positive current collector. For example, the positive electrode composite may be applied to the positive current collector, or the porous positive current collector may be filled with the positive electrode composite. In addition, the positive electrode composite may be formed into a sheet shape, and laminated so as to be brought into physical contact with the positive current collector. In the preparation of the positive electrode, the positive electrode composition may be used in a paste-like or clay-like form with the use of a dispersion medium (for example, water and/or organic media), if necessary, in addition to the constituents of the positive electrode composition. At an appropriate stage of preparing the positive electrode, if necessary, drying may be performed, or compression (such as rolling) in the thickness of the positive electrode may be performed.

From the viewpoint of energy efficiency, capacity $C_n$ of the negative electrode is preferably larger than capacity $C_p$ of the positive electrode. Ratio $C_n/C_p$ of capacity $C_n$ of the negative electrode to capacity $C_p$ of the positive electrode may be larger than 1, and may be, for example, 1.05 or more or 1.10 or more. From the viewpoint of securing a high energy density, ratio $C_n/C_p$ is preferably less than or equal to 1.15.

(Separator)

For the separator, a porous sheet with ion permeability and insulation properties is used. Examples of the porous sheet include a microporous film, a woven fabric, and a nonwoven fabric. The separator may have a single-layer structure or a multilayer structure. Examples of the separator that has a multilayer structure include a separator including a plurality of layers that differ in material and/or structure.

The material of the separator is not particularly limited, but may be a polymer material. Examples of the polymer material include olefin resins (such as polyethylene, polypropylene, and copolymers of ethylene and propylene), polyamide resins, polyimide resins (such as polyimide and polyamideimide), celluloses, polyphenylene sulfides (PPS), and polytetrafluoroethylenes (PTFE). The separator may contain an additive, if necessary. Examples of the additive include inorganic fillers.

The thickness of the separator can be selected from, for example, the range from 10 μm to 200 μm inclusive. In the case of forming the separator from a microporous film, the thickness of the separator ranges, for example, from 10 μm to 80 μm inclusive, preferably from 20 μm to 70 μm inclusive.

(Nonaqueous Electrolyte Solution)

As the nonaqueous electrolyte solution, a nonaqueous electrolyte solution with lithium ion conductivity is used. Such a nonaqueous electrolyte solution contains a nonaqueous solvent and a lithium salt as an electrolyte dissolved in the nonaqueous solvent. The nonaqueous electrolyte solution is prepared by dissolving a lithium salt in a nonaqueous solvent.

The lithium salt may be any lithium salt for use in a nonaqueous electrolyte solution of a lithium primary battery, which can be used without particular limitation. Examples of the lithium salt include lithium borofluoride, lithium hexafluorophosphate, lithium trifluoromethanesulfonate, lithium bis(fluorosulfonyl)imide, lithium bis(trifluoromethylsulfonyl)imide, and lithium perchlorate. The nonaqueous electrolyte solution may contain one lithium salt, or contain two or more lithium salts.

Examples of the nonaqueous solvent include, but are not limited to, esters (for example, carbonic acid esters, carboxylic acid esters such as γ-butyrolactone, and the like) and ethers (1,2-dimethoxyethane and the like). Examples of the carbonic acid esters include cyclic carbonates (propylene carbonates, ethylene carbonates, and the like) and chain carbonates (diethyl carbonates, ethyl methyl carbonates, and the like). The nonaqueous electrolyte solution may contain one nonaqueous solvent, or two or more nonaqueous solvents.

The concentration of the lithium salt in the nonaqueous electrolyte solution ranges, for example, from 0.1 mol/L to 3.5 mol/L inclusive.

The nonaqueous electrolyte solution may contain an additive, if necessary. Examples of the additive include vinylene carbonate, fluoroethylene carbonate, and vinylethyl carbonate. One of the additives may be used alone, or two or more thereof may be used in combination.

EXAMPLES

Hereinafter, the present invention is specifically described with reference to Example and Comparative Examples, but the present invention is not limited to the following examples.

Example 1

(1) Fabrication of Positive Electrode

As a positive electrode, 5 parts by mass of acetylene black as a conductive agent, 5 parts by mass of polytetrafluoroethylene as a binder, and an appropriate amount of pure water were added to and kneaded with 100 parts by mass of electrolytic manganese dioxide baked at 400° C. for 7 hours to prepare a positive electrode composite in a wet condition.

Next, a positive current collector made from expanded metal made of stainless steel (SUS 316) was filled with the positive electrode composition in the wet condition to prepare a positive electrode precursor. Thereafter, the positive electrode precursor was dried, subjected to rolling by roll press, and cut into predetermined dimensions to obtain a sheet-like positive electrode.

Subsequently, the filling positive electrode composite was partially removed by ultrasonic waves, and a second current collecting wire (150 μm in thickness, 5.0 mm in width) made of SUS 316 was subjected to resistance welding to the part where the positive current collector was exposed.

(2) Fabrication of Negative Electrode

Sheet-shaped metal lithium was cut into predetermined dimensions to obtain a sheet-like negative electrode. To a predetermined site of the negative electrode, a first lead (70 μm in thickness, 5.0 mm in width) made of nickel was connected by pressing. The ratio of negative electrode capacity Cn to positive electrode capacity Cp: Cn/Cp was adjusted to 1.1.

(3) Fabrication of Overdischarge Suppressing Element

Carbon black (Ketjen Black ECP 300 J) of 40 nm in average particle size (D50) of primary particles was used as a conductive material inserting lithium ions at a potential lower than that of the positive electrode, and polyolefin was used as a resin. The carbon black and the polyolefin were blended at a ratio of 45:55 by mass, subjected to dry kneading at 190° C. with the use of a roll mill, and then molded into a sheet material of 230 μm in thickness by a calendering method. Next, a pair of nickel foils of 40 μm in thickness was, as metal layers, subjected to pressure connecting to both surfaces of the sheet material by hot pressing (thermal welding) to obtain a laminate. Thereafter, the laminate was subjected to punching into a disk shape of 7.0 mm in dimeter to obtain an overdischarge suppressing element. The resistance of the overdischarge suppressing element in the thickness was 50 mΩ. The resistance was measured by a direct-current four-terminal method with the use of a resistance meter RM 3544 (manufactured by HIOKI E.E. CORPORATION).

(3) Fabrication of Electrode Body

The positive electrode and the negative electrode were spirally wound with a separator interposed therebetween to form a cylindrical wound electrode body such that the positive electrode was disposed at the outermost periphery. Used for the separator was a microporous film (40 μm in thickness) with a three-layer structure composed of a polyethylene microporous layer (intermediate layer: 20 μm in thickness) and two polypropylene microporous layers (outer layer: 10 μm in thickness) sandwiching the intermediate layer.

(4) Preparation of Nonaqueous Electrolyte Solution

Lithium trifluoromethanesulfonate as a lithium salt was dissolved at a concentration of 0.75 mol/liter in a nonaqueous solvent obtained by mixing propylene carbonate (PC), ethylene carbonate (EC), and 1,2-dimethoxyethane (DME) at a ratio of 1:1:2 by volume to prepare a nonaqueous electrolyte solution.

(5) Assembly of Lithium Primary Battery

The electrode body with a ring-like lower insulating plate disposed on the bottom thereof was inserted into a battery can made of bottomed cylindrical stainless steel (SUS 316). The second current collecting wire was subjected to resistance welding to the inner bottom surface of the battery can also serving as a positive-electrode terminal.

Next, a first current collecting wire was formed in a way that a free end side of the first lead of nickel subjected to pressure to the negative electrode was subjected to resistance welding to one nickel foil of the overdischarge suppressing element, whereas one end of a separately prepared second lead of nickel (70 μm in thickness, 5.0 mm in width)

was further subjected to resistance welding to the other nickel foil of the overdischarge suppressing element. The first lead and the second lead are equal in length, and the distance from the connection between the first lead and the negative electrode to the center of the overdischarge suppressing element (conductive layer) is L/2 where L represents the length of the first current collecting wire.

After an upper insulating plate was disposed on the upper part of the electrode body, the free end side of the second lead of the first current collecting wire was subjected to resistance welding to an external terminal (made of stainless steel (SUS 316)) fixed to a sealing plate. Next, a nonaqueous electrolyte solution was injected into the battery can to permeate the electrode group. Thereafter, the sealing plate was inserted in the vicinity of the opening of the battery can, and the opening end part of the battery can and the peripheral edge of the sealing plate were then subjected to laser welding. In this way, four hundred sealed cylindrical lithium primary batteries (17 mm in diameter, 33.5 mm in height) with such a structure as shown in FIG. 1 were prepared. Thereafter, each battery was subjected to preliminary discharge such that the battery voltage was 3.2 V.

Example 2

A battery was fabricated in the same manner as in Example 1 except that an aluminum powder (D50=40 nm) was used as the conductive material inserting lithium ions at a potential lower than that of the positive electrode.

Example 3

A battery was fabricated in the same manner as in Example 1 except that a tin powder (D50=40 nm) was used as the conductive material inserting lithium ions at a potential lower than that of the positive electrode.

Example 4

A battery was fabricated in the same manner as in Example 1 except that a zinc powder (D50=40 nm) was used as the conductive material inserting lithium ions at a potential lower than that of the positive electrode.

Example 5

A battery was fabricated in the same manner as in Example 1 except that a bismuth powder (D50=40 nm) was used as the conductive material inserting lithium ions at a potential lower than that of the positive electrode.

Comparative Example 1

The following 1a-th current collecting wire was prepared instead of the first current collecting wire. The 1a-th current collecting wire was composed of: a lead b of nickel with the same length as the entire length of the first current collecting wire; and an overdischarge suppressing element connected to one end of the lead b. The other end of the nickel lead b was connected to a predetermined site of the negative electrode by pressing. In contrast, one of the nickel foils constituting the overdischarge suppressing element was subjected to resistance welding to the external terminal fixed to the sealing plate.

Comparative Example 2

A battery was fabricated in the same manner as in Example 1, except that a copper powder (D50=40 nm) was used as the conductive material.

(6) Evaluation

The following safety evaluation was performed with the use of the fabricated lithium primary battery.

For each example, one hundred batteries were discharged to 100% of the rated capacity. Next, one hundred battery groups of 12 V were formed by connecting three unused batteries and one discharged battery in series, and discharged with a resistor of 1Ω connected at an environmental temperature of 20° C. Table 1 shows the maximum reached temperature at the center of the discharged battery and the swelling (height change rate R) of the battery. It is to be noted that the change rate of the battery outside diameter between before and after the test is less than or equal to 0.1%, which is much lower as compared with the height change rate, and the change in outside diameter can be ignored. In Table 1, the batteries according to Examples 1 to 5 are referred to as batteries A1 to A5, and the batteries according to Comparative Example 1 to 2 are referred to as batteries B1 to B2.

TABLE 1

| | | Number of Batteries (—) | | | |
|---|---|---|---|---|---|
| | | Maximum Reached Temperature T (° C.) | | | Height Change Rate |
| Battery | Conductive Material | 20 ≤ T < 40 | 40 ≤ T < 80 | 80 ≤ T < 100 | R (%) >1% |
| A1 | Carbon Black | 100 | 0 | 0 | 0 |
| A2 | Al | | | | |
| A3 | Sn | | | | |
| A4 | Zn | | | | |
| A5 | Bi | | | | |
| B1 | Carbon Black | 0 | 0 | 100 | 100 |
| B2 | Cu | 0 | 0 | 100 | 100 |

In batteries A1 to A5 according to Examples, the maximum reached temperature was lower than 40° C. in all of the battery groups, and the height change rate was also less than 1% therein. This is because the resistance value of the conductive layer was instantaneously increased in the discharged battery, thereby completely stopping the overdischarge therein.

In contrast, in battery B1 according to Comparative Example 1, the maximum reached temperature was 80° C. or higher, and the swelling of the battery was also increased. This is believed to be because the distance between the overdischarge suppressing element and the electrode body was large, thereby failing to secure sufficient contact with the electrolyte solution, and because the overdischarge suppressing element was directly connected to the external terminal, thereby suppressing the expansion and deformation of the conductive layer.

Also in battery B2 according to Comparative Example 2, the maximum reached temperature was 80° C. or higher, and the swelling of the battery was also increased. This is considered to be because Cu of the conductive material failed to insert lithium, thereby causing the conductive layer to fail to expand.

INDUSTRIAL APPLICABILITY

The lithium primary battery according to the present invention is excellent in safety against overdischarge, and thus suitable for mounting in a device for use with a plurality of batteries connected. Examples of such a device include various devices such as an automatic external defibrillator (AED) and a light.

REFERENCE MARKS IN THE DRAWINGS 10 lithium primary battery
100 battery can
200 electrode body
201 positive electrode
202 negative electrode
203 separator
210 first current collecting wire
211 first lead
212 second lead
213 overdischarge suppressing element
214 first metal layer
215 second metal layer
216 conductive layer
220 second current collecting wire
230A upper insulating plate
230B lower insulating plate
300 sealing body
310 sealing plate
320 gasket
330 external terminal

The invention claimed is:

1. A lithium primary battery comprising:
an electrode body;
a nonaqueous electrolyte solution;
a battery can that houses the electrode body and the nonaqueous electrolyte solution;
a sealing body that seals an opening of the battery can; and
a current collecting wire that electrically connects the electrode body and the sealing body,
wherein the electrode body includes a positive electrode, a negative electrode, and a separator interposed between the positive electrode and the negative electrode,
the negative electrode includes metal lithium, or includes metal lithium and a lithium alloy,
the current collecting wire includes:
a first lead connected to one of the positive electrode and the negative electrode;
a second lead connected to the sealing body or the battery can; and
an overdischarge suppressing element interposed between the first lead and the second lead,
the overdischarge suppressing element includes:
a first metal layer connected to the first lead, the first metal layer being thinner than the first lead;
a second metal layer connected to the second lead, the second metal layer being thinner than the second lead; and
a conductive layer interposed between the first metal layer and the second metal layer disposed to face each other,
the conductive layer includes a resin and a conductive material dispersed in the resin,
an insulating plate is arranged between the electrode body and the sealing body, and the overdischarge suppressing element is arranged between the insulating plate and the sealing body,
the conductive material inserts lithium ions at a potential that is lower than a potential of the positive electrode, and
wherein a distance from a connection between the first lead and the positive electrode or the negative electrode to a center of the overdischarge suppressing element is less than or equal to 2L/3 where L represents a length of the current collecting wire.

2. The lithium primary battery according to claim 1, wherein the first lead is connected to the negative electrode.

3. The lithium primary battery according to claim 1, wherein the conductive layer has a circular shape.

4. The lithium primary battery according to claim 1, wherein the positive electrode includes a manganese dioxide as a positive electrode active material.

5. The lithium primary battery according to claim 1, wherein the conductive material includes at least one selected from the group consisting of a metal, a semimetal, and a carbon material.

6. The lithium primary battery according to claim 5, wherein the metal includes at least one selected from the group consisting of Al, Zn, Cd, In, Sn, Pb, Ti, and Bi.

7. The lithium primary battery according to claim 5, wherein the semimetal includes at least one selected from the group consisting of Ge, Si, Se, and Te.

8. The lithium primary battery according to claim 5, wherein the carbon material includes at least one selected from the group consisting of graphite, non-graphitizable carbon, carbon black, and a carbon fiber.

9. A lithium primary battery comprising:
an electrode body;
a nonaqueous electrolyte solution;
a battery can that houses the electrode body and the nonaqueous electrolyte solution;
a sealing body that seals an opening of the battery can; and
a current collecting wire that electrically connects the electrode body and the sealing body or connects the electrode body and the battery can,
wherein the electrode body includes a positive electrode, a negative electrode, and a separator interposed between the positive electrode and the negative electrode, the negative electrode includes metal lithium, or includes metal lithium and a lithium alloy,
the current collecting wire includes:
a first lead connected to one of the positive electrode and the negative electrode;
a second lead connected to the sealing body or the battery can; and
an overdischarge suppressing element interposed between the first lead and the second lead,
the overdischarge suppressing element includes:
a first metal layer connected to the first lead, the first metal layer being thinner than the first lead;

a second metal layer connected to the second lead, the second metal layer being thinner than the second lead;

a conductive layer interposed between the first metal layer and the second metal layer disposed to face each other, the conductive layer includes a resin and a conductive material dispersed in the resin, and the conductive material inserts lithium ions at a potential that is lower than a potential of the positive electrode; and the overdischarge suppressing element is held so that the conductive layer is not subject to pressure in a thickness direction.

\* \* \* \* \*